United States Patent  [15] 3,680,576
Kiwak  [45] Aug. 1, 1972

[54] BONDED METAL STRUCTURE HAVING INTRICATE PASSAGES FORMED THEREIN, AND A METHOD OF MAKING SAID STRUCTURES

[72] Inventor: Robert S. Kiwak, Dearborn Heights, Mich.

[73] Assignee: The Bendix Corporation, Southfield, Mich.

[22] Filed: Sept. 2, 1970

[21] Appl. No.: 69,059

Related U.S. Application Data

[63] Continuation-in-part of Ser. No. 562,246, July 1, 1966, abandoned.

[52] U.S. Cl. .................................... 137/81.5, 29/423
[51] Int. Cl. ................................................. F15c 5/00
[58] Field of Search ........ 137/81.5; 29/423; 156/2, 3, 156/7, 18

[56] References Cited

UNITED STATES PATENTS

| | | | |
|---|---|---|---|
| 3,427,706 | 2/1969 | Jaffee | 29/423 X |
| 3,044,160 | 7/1962 | Jaffee | 29/423 |
| 3,396,619 | 8/1968 | Bowles et al. | 137/81.5 X |
| 3,534,757 | 10/1970 | Doherty | 137/81.5 |

*Primary Examiner*—William R. Cline
*Attorney*—William F. Thornton and Plante, Hartz, Smith & Thompson

[57] ABSTRACT

This invention pertains to bonded metal laminae forming fluidic structures having intricate passages therein, and methods for manufacturing such structures using laminae formed from a first metal and laminae formed from a second metal. The disclosure teaches that a complex bonded structure that includes a plurality of laminae placed above and below a laminae having a pattern cut therein to form a large cavity or passageway can be formed in a single bonding step if the cavity is first filled with support metal. The support metal prevents deformation of the structure during bonding by preventing any metal laminae from being pushed into the cavity. It also transmits bonding pressure across the cavity so that the portions of the laminae above and below the cavity and aligned with the cavity will be bonded to each other. The disclosure also describes a bonded fluidic passageway structure that can be readily disassembled for inspection or cleaning of the passageways. This structure is formed from a plurality of laminae parts constructed from a first metal and another lamina part which comprises a pneumatic seal or gasket constructed from a second metal that can be leached out or otherwise chemically removed by a process that will not affect any other part of the structure. When assembled, the pneumatic seal lamina is disposed in a position where its removal will grant access to the passageway.

16 Claims, 8 Drawing Figures

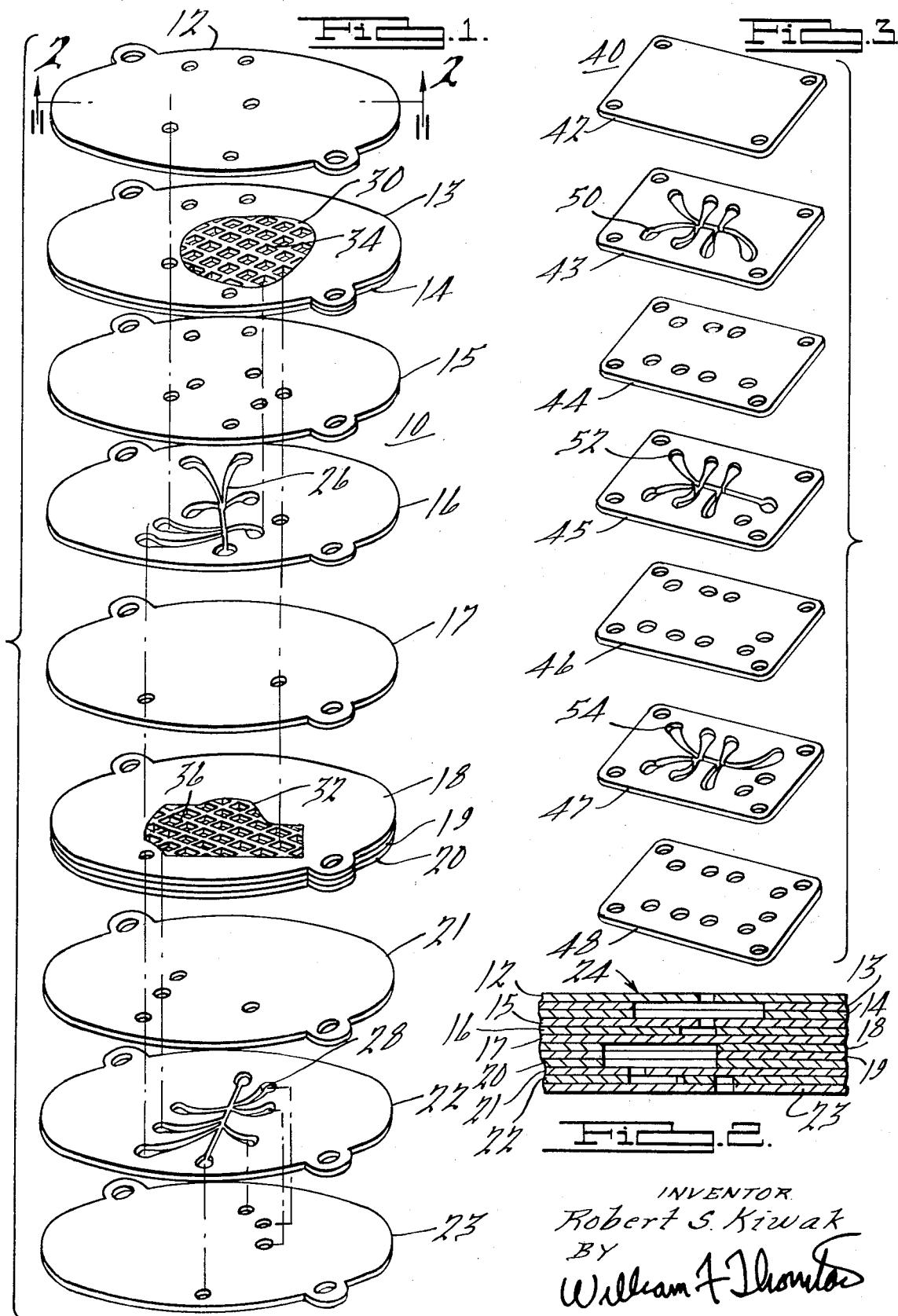

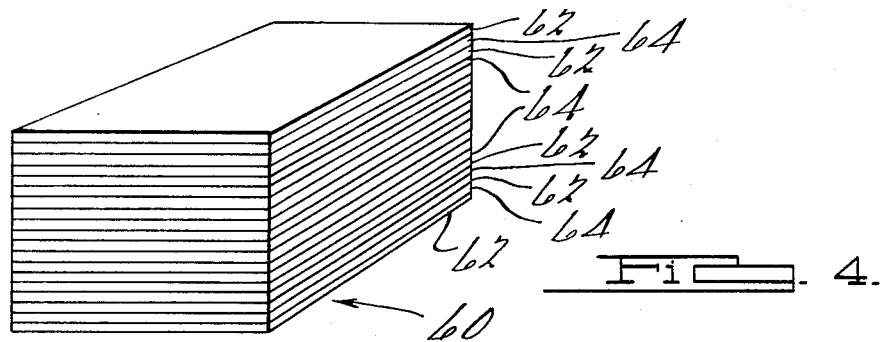
FIG. 4.
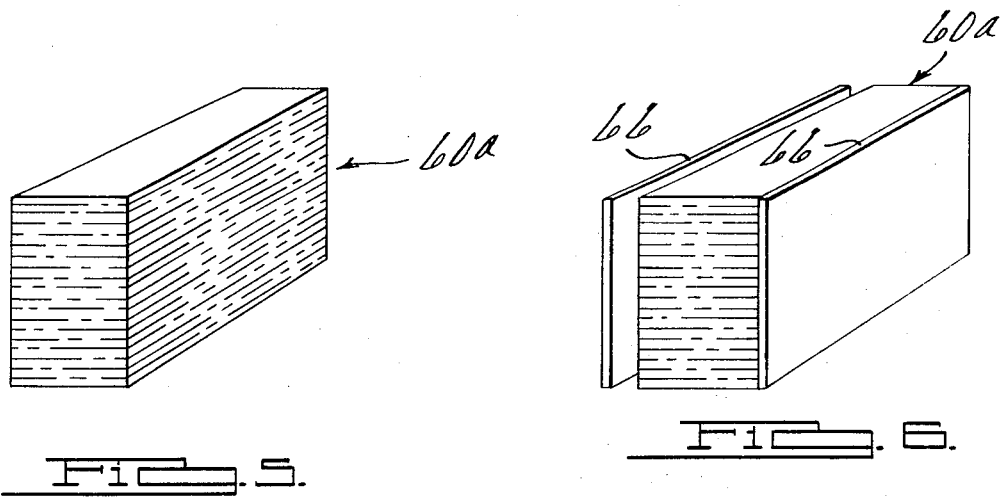
FIG. 5.
FIG. 6.
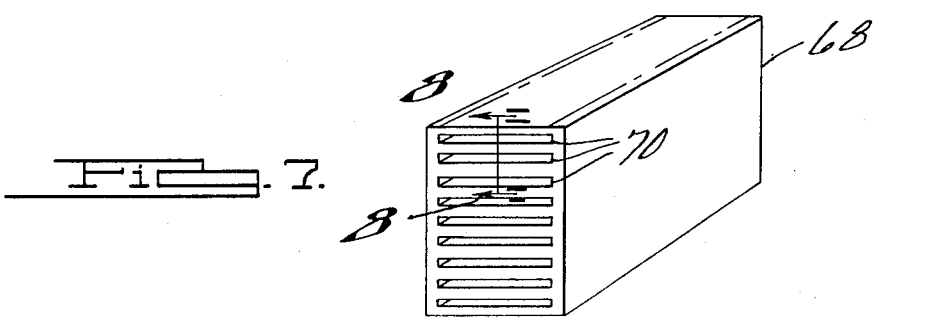
FIG. 7.
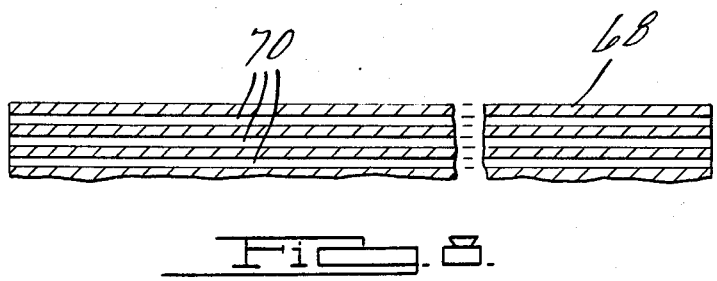
FIG. 8.
INVENTOR.
Robert S. Kiwak
BY
William J. Thomas
ATTORNEY.

BONDED METAL STRUCTURE HAVING INTRICATE PASSAGES FORMED THEREIN, AND A METHOD OF MAKING SAID STRUCTURES

CROSS REFERENCE TO RELATED PATENT

This is a continuation-in-part of application Ser. No. 562,246, "Method of Forming Intricate Passages in Metal," filed July 1, 1966, now abandoned.

It is an object of this invention to provide an improved one-step bonding method for forming a bonded fluidic device such as that illustrated in U.S. Pat. No. 3,494,372, "Laminated Vortex Amplifier with a Pickoff Formed in One Lamina," R. S. Kiwak, which includes one cavity above another and not completely aligned with the lower cavity, and also includes a plurality of laminae both above and below a cavity of substantial size.

It is an object of this invention to form complex bonded structures having a plurality of laminated metallic parts positioned above and below a laminated metallic part having a cavity formed therein. The cavity is filled with a support metal during bonding so that bonding pressures will be transmitted across the passageway and bond the portions of the other metal laminae aligned with the cavity to each other.

It is an object of this invention to form bonded structures having intricate passageways of precise dimension formed therein by filling the passageways during bonding with a support metal having a coefficient of expansion substantially equal to and a melting point at least substantially as high as that of the metal parts being supported so that no deformation will be allowed to occur during bonding.

It is an object of this invention to facilitate the chemical removal of a support member after bonding is completed by forming the support member from a honeycomb grid-like structure to minimize the quantity of support member which must be leached out or otherwise chemically removed, and to maximize the surface area of the support member where a chemical reaction may occur.

It is an object of this invention to provide a laminated pneumatic seal or gasket between the laminae parts of a fluidic or other passageway structure. The pneumatic seal lamina is formed from a metal that can be chemically removed from the structure without affecting any other metal part, and is placed so that its removal will grant access to the passageway.

It is an object of this invention to construct a bonded fluidic passageway device that can be disassembled for inspection or cleaning without performing a cutting or grinding operation that could distort or damage any part to be inspected or cleaned.

It is an object of this invention to diffusion bond a layer, such as a nickel layer, between two parts, such as stainless steel parts, machine, shape, lap and polish the diffused stainless steel nickel parts to desired shapes and tolerances. A further stainless steel member may be diffusion bonded directly to the stainless steel parts thus machined. The nickel is then removed as by leaching with boiling nitric acid, to provide intricate passages in a unified, uniform stainless steel structure.

It is an object of this invention to provide in the method of the preceding object more layers, strips, or patterns of nickel after the machining, shaping, step; to cover such layers, strips, or patterns of nickel with additional layers of stainless steel; to diffusion bond the added layers of nickel and stainless steel to the previously machined body, to further machine shape, lap and polish the diffused structure, to leach out the nickel material with boiling nitric acid to form spacings, passages, and patterns in the stainless steel which heretofore has not been possible or has been possible only with great expense and difficulty.

It is an object of this invention to fill cavities in metal structures such as stainless steel structures with material such as nickel, diffusion bond, subject the thusly supported stainless steel to heavy machine operations, and then afterwards to leach out the nickel with boiling nitric acid thereby preserving the cavity in exactly its original dimensions even after the heavy machining.

It is an object of this invention to provide pneumatic seals between stainless steel parts by diffusion bonding a layer of nickel between the stainless steel parts with the nickel layer having enough thickness after diffusion bonding that leaching with boiling nitric acid will separate the stainless steel parts which later can be resealed by the addition of a nickel layer and a further diffusion bond.

These and other objects, features, and advantages of this invention, which are defined by the appended claims, will become more apparent when the preferred embodiments of this invention are considered in connection with the drawings in which:

FIG. 1 is an exploded view of a stack of metal laminae that form a portion of a fluidic device when bonded together. Two of the laminae contain large cavities that are filled with a honeycomb support metal that aids in the bonding process and is subsequently leached out.

FIG. 2 is a cross-sectional view of a bonded fluidic device formed from the lamina shown in FIG. 1 and cut away along line 2—2.

FIG. 3 is an exploded view of a portion of a fluidic circuit formed from a plurality of laminae, in which two laminae comprise pneumatic seals formed from a material that can be chemically removed from the fluidic circuit portion to obtain access to the fluidic passages without affecting any other lamina part.

FIG. 4 shows a stack of alternately placed layers of stainless steel and nickel.

FIG. 5 shows the diffusion bonded, machined, and polished structure produced from the stack of FIG. 4.

FIG. 6 shows the addition of stainless steel side plates to the machined embodiment of FIG. 5.

FIG. 7 shows the resultant flow straightener which is produced after leaching out the nickel layers from the object of FIG. 6.

FIG. 8 is a partial broken section taken at 8—8 of FIG. 7.

With reference to the drawings, FIG. 1 shows a stack 10 of 12 lamina parts numbered 12–23 and formed preferably of stainless steel. When bonded together, these parts 12–23 form a portion 24 (illustrated in FIG. 2) of a fluidic circuit. As is seen from FIG. 1, the fluidic circuit portion 24 includes two standard operating fluidic circuit elements placed above each other, namely OR gates 26 and 28 formed in the laminae 16 and 22, respectively. The structure also includes a plenum or cavity 30 formed in the laminae 13 and 14; a plenum or cavity 32 formed in the laminae 18, 19, and 20; and a number of small holes formed in the other laminae to transmit fluid between the various OR gates and plenums. Prior to bonding, the cavities 30 and 32 are filled with a support material that conforms to the configuration of the cavity. It is preferred to use the honeycomb or grid-like support elements 34 and 36, respectively, formed preferably of nickel.

The circuit portion 24 is formed from the stack 10 of laminae parts in a bonding process in which all of the laminae 12-23 are first assembled into a single stack 10 and then subjected to sufficient heat and pressure to bond each laminae to its adjacent laminae. Although a great number of different bonding pressures and temperatures can be used with this invention depending upon the selection of metals to be used, it is convenient to form fluidic stainless steel devices in a temperature range between 2,050°F and 2,175°F under a pressure 72-100 psi applied for 10 to 30 minutes. These temperatures, pressures, and time intervals diffusion bond the various parts to each other. Bonding is performed in a non-reactive or inert gas atmosphere.

The honeycomb grid-like support elements 34 and 36 perform a number of functions during the bonding process. First, the support elements prevent deformation of the cavities 30 and 32 during bonding. That is, the honeycomb grid-like parts 34 and 36 fill those cavities so that the other laminae 12 and 17 formed preferably of stainless steel, which are positioned above the cavities 30 and 32, respectively, will not be pushed into the cavities during bonding. The illustrated honeycomb structures provide sufficient support to prevent deformation of the parts above and below the cavities even though they possess a number of holes and thus do not fill each and every point of the cavities with solid material. The honeycomb structures provide sufficient support notwithstanding the fact that the high bonding temperatures and pressures would otherwise cause a lamina to deform if that lamina were not supported over a substantial distance. Thus the lamina will not deform or warp if it is supported at closely spaced intervals. The OR-gates 26 and 28 and the holes formed in the various other laminae 12-23 are sufficiently small so that support metal is not needed to maintain the shape of those cavities at the bonding temperatures and pressures typically used to form fluidic devices.

The cavities 30 and 32 are properly and adequately supported throughout the bonding process because the selected metal support parts 34 and 36, for example, nickel, have a coefficient of expansion substantially equal to that of the other selected metal lamina, such as stainless steel, and a melting point at least substantially as high as that of stainless steel. If the support parts expanded faster than the parts being supported, the cavities would be enlarged during a bonding operation. And conversely, if the support parts either expanded at a slower rate than the parts being supported, or begin melting during the bonding process, the laminae would not be properly supported during the entire bonding operation and would be pushed into the cavities.

The support elements 34 and 36 enable the fluidic circuit portion 24 to be formed in a single bonding step. If it were not for the support provided by the elements 34 and 36, the portions of the other laminae aligned with those cavities would not become bonded to each other unless they were so bonded prior to the time at which they were aligned with those cavities. For example, even if bonding pressure were applied from both above and below the stack 10 of laminae parts, the portions of laminae 15, 16, and 17 aligned with both cavities 30 and 32 would not become bonded to each other if the support elements 34 and 36 were not present because the pressure transmitted across the cavities 30 and 32 would be inadequate to form the bond. Thus, no bonding pressure would be applied to the portions of the laminae 15, 16, and 17 that are aligned with both of those cavities. In addition, the portions of the various laminae aligned with only one of the cavities 30 and 32 would not be bonded to each other if the support elements were not present because an applied bonding pressure would not press those portions of the laminae together and create a bond, but would instead push those portions of the laminae into one of the cavities.

The honeycomb support elements 34 and 36 transmit sufficient pressure across the cavities 30 and 32 to bond portions of the other laminae parts aligned with those two cavities to each other even though pressure is not transmitted to each and every point of the laminae 17 aligned with cavities 30 or 32. Pressure need not be applied to each and every surface point of laminae parts in order to create a good bond between those parts; a good bond will be obtained if sufficient pressure is applied to the closely spaced points provided by the honeycomb structure.

After bonding, the honeycomb support elements 34 and 36 are leached out of the bonded structure. Although a solid metal or other material may be used, the honeycomb construction of the support elements 34 and 36 facilitates their removal by minimizing the amount of material that must be dissolved, and by maximizing the surface area of the support element upon which a reaction can occur.

FIG. 3 illustrates an exploded or disassembled view of a second fluidic device 40 comprising seven laminae parts numbered 42-48. The fluidic device 40 is commonly referred to as a three-element AND gate with the three operating elements being mono-stable amplifier cavities of passageways 50, 52, and 54 formed in the laminae 43, 45, and 47, respectively. Laminae 42, 43, 45, 47, and 48 are formed of a metal that is non-reactive with a solvent that reacts with the metal from which laminae 44 and 46 are formed. In the preferred embodiment, the laminae 44 and 46 are formed from a metal such as nickel which can be chemically removed from the structure by use of a solvent such as nitric acid without affecting any other parts. The nickel parts form gaskets or pneumatic seals that are indistinguishable from any other part during operation of the device 40. As was the case with the portion 24 of the fluidic circuit illustrated in FIGS. 1 and 2, a number of different bonding pressures and temperatures including those used to form the fluidic portion 24, can be used to form the fluidic device 40. The fluidic device 40 differs from other fluidic devices in that an operator can obtain access to passageways 50, 52, and 54 after a period of use for purposes such as the cleaning of those passageways, or the inspection of the passageway walls for wear caused by fluid flow, simply by dissolving the pneumatic seal elements 44 and 46 with a reactive such as nitric acid. Since nitric acid will not react with stainless steel, the elements 44 and 46 can be removed without affecting or damaging any other part of the device 40 in any way.

FIG. 4 shows a stack 60 of alternate layers or shims of stainless steel 62 and nickel 64 with both the nickel and stainless steel layers being five mils thick in this embodiment and having a copper flashing on both sides of 50 microinches thickness. The stack is then diffusion bonded in a temperature range between 2,050°F and 2,175°F, e.g. at 2,150°F, for 10 to 30 minutes, e.g., 20 minutes, under a 50 psi load in a hydrogen atmosphere. After the diffusion bonding, the stack is machined to the desired size and lapped and polished on all faces. The machined and polished laminate 60a is shown in FIG. 5.

Stainless steel side plates 66, which may also have a 50-microinch copper flashing on the side facing laminate 60a, are placed against opposite sides of the machined diffusion bonded laminate 60a as shown in FIG. 7 and further diffusion bonding at 2,150°F for 20 minutes under 50 pounds per square inch load in a hydrogen atmosphere is performed. The next step is to leach out the nickel layers 64 with boiling nitric acid resulting in a flow straightener 68 shown in FIG. 7 having a plurality of very thin, long, uniform passages 70 formed therethrough by a relatively inexpensive method.

While the above layers have been described with a copper flashing, satisfactory results are obtainable without the flashing by increasing the pressure during diffusion bonding at 75–100 psi.

It would also be within the scope of this invention to provide in the above preferred embodiment, additional nickel and stainless steel diffusion bonding to the laminate 60a shown in FIG. 5 by providing strips of nickel, layers of nickel, or patterns of nickel, which may later be covered with stainless steel; diffusion bonding; and then machining to provide, if desired, highly complex patterns of nickel in stainless steel which may later be leached out, regardless of the thinness and complexity of the nickel layers, with boiling nitric acid to provide a unified, uniform structure of stainless steel having very intricate and minute passages therein. For example, slots 5 mils high, 400 mils wide, and 380 mils deep and slots 1 mil high, 450 mils wide and 400 mils deep have been made by the above process. Slots less than 1 mil high are feasible by electroplating the nickel to the desired thickness on stainless steel parts before diffusion bonding.

Also, bundles of nickel and stainless steel wire may be formed in a desired pattern, diffusion bonded, then twisted, bent or shaped and machined to desired configurations, after which passages or spacings can be formed by leaching out the nickel wires.

Having thus described a combination of metals that can be used to practice this invention, namely, the combination of nickel and stainless steel, a number of modifications will be obvious to those skilled in this art. Support elements formed from elements other than nickel can be used to support both stainless steel structures and structures formed from metals other than stainless steel. Selection of support parts requires only that the support part can be removed without damaging the part being supported and that the support part will not melt or expand at a rate such that it would not provide proper support throughout the entire bonding process. It will also be obvious to form pneumatic seals formed from other than nickel parts in stainless steel structures and structures formed from other metals. The pneumatic seal need only be formed from a material that can be chemically removed from the combination without damaging any other metal part, and that will not melt or expand to a distorted shape during the bonding process. In addition, support parts can be used to maintain the shape of passageways during bonding of a fluidic device including a pneumatic seal. When this is done, the support element must be formed from a material that can be chemically removed from the combination without affecting either the pneumatic seal or any other part of the structure.

Having thus described embodiments of this invention, what is claimed is:

1. A method of constructing a bonded metal fluidic passageway structure comprising the steps of:
   placing a plurality of laminar elements having openings formed therein in a stack so that said openings in said elements define a fluid flow passageway;
   adding to said stack at least one laminar element having a cavity of large cross-sectional area formed therein, said plurality of parts being placed so that said passageway communicates with said large cavity and so that at least a portion of said passageway is aligned with said large cavity;
   filling said cavity with a support part for maintaining the shape of said cavity, said support part being formed from a material that is soluable in a solvent that will not react with any part of the fluidic structure contacting said support part;
   bonding each of the parts of the fluidic structure to its adjacent parts; and
   chemically removing said support part with a solvent that is reactive against said support part but not against any part contacting said support part.

2. The method set forth in claim 1 in which said step of bonding is performed by applying a quantity of heat and pressure to said material parts that would deform the parts adjacent said large cavity containing part by pushing portions of those adjacent parts into said cavity if said cavity were not filled with a support metal.

3. The method set forth in claim 1 in which:
   said step of placing a plurality of parts in a stack comprises placing in said stack a part having a standard operating fluidic circuit element formed therein and at least one other part with a cavity formed therein defining a fluid flow passage communicating with said standard circuit element; and
   said part having a cavity of large cross-sectional area formed therein is placed so that at least a portion of said circuit element is aligned with said large cavity.

4. A method of constructing a bonded fluidic structure having a fluid flow passageway formed therein and also having a plurality of elements aligned with and displaced vertically from a portion of said passageway comprising the steps of:
   assembling a plurality of first metal parts and at least one second metal part to form a structure having said first metal parts defining the outline of a fluidic passageway structure and said second metal part filling at least a portion of a fluid flow passageway, at least two of said first metal parts being aligned with and displaced vertically from said second metal part;

diffusion bonding each assembled first metal part to its adjacent metal parts at a pressure below the yield strength of said first metal, said second metal part transmitting bonding pressure across said passageway portion to thereby bond the portions of said vertically displaced parts aligned with said passageway portion;

chemically removing said second metal with a solvent that is reactive against said second metal but not against any of the other metal parts of the bonded structure to provide passages within said bonded structure corresponding to the shape and dimension of said second metal part.

5. The method set forth in claim 4 in which said first metal parts are shaped so that the assembled parts define a structure having a cavity of predetermined configuration, and said second metal part comprises a honeycomb structure shaped to fill said cavity.

6. The method of claim 4 in which:
said diffusion bonding comprises applying heat and pressure to said assembled parts to bond said assembled parts; and
said second metal has a coefficient of expansion substantially equal to and a melting point at least substantially high as that of said first metal to transmit bonding pressure across said passageway portion during the entire bonding process without deforming any part.

7. The method of claim 6 in which:
said first metal comprises stainless steel and said second metal comprises nickel; and
said step of chemically removing said second metal comprises leaching out said second metal from between the confines of the other metal parts.

8. The method of claim 6 in which said step of diffusion bonding is performed in a temperature range between 2,050°F to 2,175°F for a period of 10 to 30 minutes under a pressure of 75–100 psi.

9. The method of claim 4 in which said assembled structure is formed entirely of parts formed from said first metal and parts formed from said second metal.

10. The method of claim 4 in which said assembling said first and second metal parts includes the step of electroplating a layer of said second metal to at least one of said first metal parts.

11. The method of claim 4 in which said first metal comprises copper flashed stainless steel and said second metal comprises copper flash nickel; and in which said step of diffusion bonding is performed in a temperature range of 2,050°F to 2,175°F for a period of 10 to 30 minutes under a pressure of 50–100 psi.

12. A method of constructing a bonded fluidic structure having a fluid flow passageway formed therein and a pneumatic seal part which can be readily removed to obtain access to said passageway comprising the steps of:
placing a plurality of parts formed from a first metal in a stacked relation with each other and with at least one part formed from a second metal that is chemically reactive with a solvent that will not react with said first metal, said stacked parts defining a fluidic structure having a fluid flow passageway formed therein, and said part formed from a second metal comprising a pneumatic seal forming at least a portion of one wall of said passageway and being disposed in a position where disolution of said second metal part will grant access to at least a portion of said passageways; and
bonding each of said parts to its adjacent parts.

13. The method set forth in claim 12 in which said first metal comprises stainless steel, said second metal comprises nickel, and said step of bonding comprises applying sufficient heat and pressure to said stacked metal parts to diffusion bond each of said parts to its adjacent parts.

14. In a fluidic passageway device formed from a plurality of bonded parts, the improvement comprising a pneumatic seal part forming at least a portion of one wall of the passageway and being disposed in a position where removal of said seal part will grant access to at least a portion of the flow passageway, said seal part being formed from a metal that is chemically reactive with a solvent that will not react with any part of said fluidic device in contact with said seal element.

15. A bonded metal fluidic passageway structure comprising:
a non-porous, structurally rigid metallic lamination formed of a first metal and containing a first fluid flow passageway portion;
a pair of non-porous, structurally rigid metallic outer laminations, one lamination of said pair being bonded to each side of said passageway containing lamination in pneumatically sealed relationship;
at least one of said pair of laminations having an opening formed therein, said opening comprising a second fluid flow passageway portion communicating with said first passageway portion; and
at least one of said pair of laminations being formed of a second metal which is chemically reactive with a solvent that will not react with said first metal whereby dissolution of said second metal will provide access to said passageway.

16. A bonded metal fluidic passageway structure comprising:
a plurality of non-porous, structurally rigid metallic laminations placed in a superimposed relation, one of said laminations having a fluidic flow configuration formed therein and being disposed between two other of said laminations, and each of said two other laminations having openings therein communicating with said fluidic flow configuration;
an outer lamination superimposed on one of said two other laminations and containing a cavity formed therein communicating with said openings in said one of said two other laminations; and
soluable support material filling said cavity, whereby a bonding pressure may be applied uniformly to all of said laminations without deformation of said cavity.

* * * * *